United States Patent
Sharma et al.

(10) Patent No.: US 11,706,816 B2
(45) Date of Patent: *Jul. 18, 2023

(54) APPARATUS AND METHOD FOR A MOBILE TELECOMMUNICATIONS SYSTEM

(71) Applicant: Sony Group Corporation, Tokyo (JP)

(72) Inventors: Vivek Sharma, Basingstoke (GB); Brian Alexander Martin, Basingstoke (GB); Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 17/395,513

(22) Filed: Aug. 6, 2021

(65) Prior Publication Data
US 2021/0368550 A1    Nov. 25, 2021

Related U.S. Application Data

(63) Continuation of application No. 16/496,454, filed as application No. PCT/EP2018/058105 on Mar. 29, 2018, now Pat. No. 11,109,415.

(30) Foreign Application Priority Data

Mar. 31, 2017    (EP) .................................... 17164062

(51) Int. Cl.
*H04W 74/08*    (2009.01)
*H04W 48/02*    (2009.01)

(52) U.S. Cl.
CPC ....... *H04W 74/0833* (2013.01); *H04W 48/02* (2013.01)

(58) Field of Classification Search
None
See application file for complete search history.

(56) References Cited

U.S. PATENT DOCUMENTS

| 10,356,682 | B2 * | 7/2019 | Fasil Abdul | ............ H04L 1/189 |
| 2010/0184448 | A1 * | 7/2010 | Wu | ........................ H04W 76/10 455/450 |
| 2014/0370890 | A1 * | 12/2014 | Huang | .................. H04W 48/10 455/434 |

(Continued)

FOREIGN PATENT DOCUMENTS

| EP | 3082366 A1 | 10/2016 |
| EP | 3229529 A1 | 10/2017 |

(Continued)

OTHER PUBLICATIONS

"Technical Specification Group Radio Access Network; Evolved Universal Terrestrial Radio Access (E-UTRA) and Evolved Universal Terrestrial Radio Access Network (E-ETRAN)", 3GPP TS 36.300 V14.1.0, Dec. 30, 2016, pp. 277-278.

(Continued)

*Primary Examiner* — Hong S Cho
(74) *Attorney, Agent, or Firm* — Xsensus LLP

(57) ABSTRACT

An apparatus comprising circuitry configured to perform a Random Access procedure that is based on one or more access control parameters that are specific for a predefined coverage level.

12 Claims, 9 Drawing Sheets

(56) References Cited

U.S. PATENT DOCUMENTS

| | | | | |
|---|---|---|---|---|
| 2016/0234715 | A1* | 8/2016 | Futaki | H04W 48/06 |
| 2016/0330768 | A1* | 11/2016 | Hu | H04W 74/0833 |
| 2017/0231011 | A1* | 8/2017 | Park | H04W 72/0446 |
| 2017/0280481 | A1* | 9/2017 | Stern-Berkowitz | H04L 1/1854 |

FOREIGN PATENT DOCUMENTS

| | | |
|---|---|---|
| JP | 2019-512979 A | 5/2019 |
| JP | 2020-501422 A | 1/2020 |
| WO | 2015/116870 A1 | 8/2015 |
| WO | 2016/161408 A1 | 10/2016 |
| WO | 2017174635 A1 | 10/2017 |
| WO | 2018095542 A1 | 5/2018 |

OTHER PUBLICATIONS

Intel Corporation, CE Level Based Access Barring and Load Control for eFeMTC, 3GPP TSG RAN WG2 #99bis R2-1710644, Sep. 29, 2017, Internet<URL:http://www. 3gpp.org/ftp/tsg_ran/WG2_RL2/TSGR2_99bis/Docs/R2-1710644.zip>.

Nokia Networks, Remaining Details of Random Access in Coverage Enhancement?, 3GPP TSG-RAN WG1#81 R1-152549, May 15, 2015, Internet<URL:http://www.3gpp.org/ftp/tsg_ran/WG1_RL1/TSGR1_81/Docs/R1-152549.zip>.

International Search Report and Written Opinion dated Jun. 7, 2018 for PCT/EP2018/058105 filed on Mar. 29, 2018, 12 pages.

3GPP, "Digital cellular telecommunications system (Phase 2+) (GSM);Universal Mobile Telecommunications System UMTS); LTE; Man-Machine Interface (MMI) of the User Equipment (UE)", 3GPP TS 22.030 version 15.0.0 Release 15, ETSI TS 122 030 V15.0.0, Jul. 2018, pp. 1-29.

3GPP, "Digital cellular telecommunications system (Phase 2+) (GSM); Universal Mobile Telecommunications System (UMTS); LTE; Non-Access-Stratum (NAS) functions related to Mobile Station (MS) in idle mode", 3GPP TS 23.122 version 14.2.0 Release 14, ETSI TS 123 122 V14.2.0, Apr. 2017, pp. 1-55.

3GPP,"LTE; Evolved Universal Terrestrial Radio Access (E-UTRA); Physical layer procedures", 3GPP TS 36.213 version 14.2.0 Release 14, ETSI TS 136 213 V14.2.0, Apr. 2017, pp. 1-455.

3GPP,"LTE; Evolved Universal Terrestrial Radio Access (E-UTRA); Medium Access Control (MAC) protocol specification", 3GPP TS 36.321 version 14.2.1 Release 14, ETSI TS 136 321 V14.2.1, May 2017, pp. 1-7.

3GPP,"LTE; Evolved Universal Terrestrial Radio Access (E-UTRA); Radio Resource Control (RRC); Protocol specification", 3GPP TS 36.331 version 14.2.2 Release 14, ETSI TS 136 331 V14.2.2, May 2017, pp. 1-726.

Sony,"On CE Mode Capability of eMTC", 3GPP TSG RAN WG1 Meeting No. 83 R1-156979, Anaheim, USA, Nov. 15-22, 2015, 2 pages.

Alcatel-Lucent et al., "Coverage Enhancement Targets", 3GPP TSG RAN WG1 Meeting No. 79 R1-144695, San Francisco, USA, Nov. 17-21, 2014, 3 pages.

Vodafone,"Further consideration of Access Control for NR", 3GPP TSG-RAN2 Meeting No. 97-BIS R2-1702807, Spokane, USA, Apr. 3-7, 2017, 2 pages.

Ericsson, "New WI: Even further enhanced MTC for LTE", 3GPP TSG RAN Meeting No. 74 RP-162472, Vienna, Austria, Dec. 5-8, 2016, 6 pages.

Ericsson et al.,"New WID on Even further enhanced MTC for LTE", 3GPP TSG RAN Meeting No. 75 RP-170732 (revision of RP-170465), Dubrovnik, Croatia, Mar. 6-9, 2017, 4 pages.

Huawei et al., "New WID on Further NB-IoT enhancements", 3GPP TSG RAN Meeting No. 75 RP-170852, Dubrovnik, Croatia, Mar. 6-9, 2017, 6 pages.

Office Action issued Sep. 15, 2020 in European Patent Application No. 18 713 950.6, 8 pages.

Samsung Electronics: "Discussions on downlink control channel based coverage class update", 3GPP GERAN2 Meeting Adhoc#3, GPC150338, Jun. 29-Jul. 2, 2015, XP051614181, 4 pages.

Alcatel-Lucent, et al., Coverage Enhancement Targets, R1-144695, 3GPP TSG RAN WG1 Meeting #79 San Francisco, USA, Nov. 17-21, 2014.

Vodafone, Further consideration of Access Control for NR, R2-1702807, 3GPP TSG-RAN2 Meeting #97-BIS Spokane, USA, Apr. 3-7, 2017.

* cited by examiner

```
201
 ╲
 AC-BarringConfig::=           SEQUENCE {
     ac-BarringConfigLevel0 SEQUENCE {
202      ac-BarringFactor          ENUMERATED {
              ╲__ 202-1          p00, p05, p10, p15, p20, p25, p30, p40,
                                 p50, p60, p70, p75, p80, p85, p90, p95},
         ac-BarringTime ___/ 202-2   ENUMERATED {s4, s8, s16, s32, s64, s128,
                         __ 202-3                s256, s512},
203      ac-BarringForSpecialAC    BIT STRING (SIZE(5))
     }
     ac-BarringConfigLevel1 SEQUENCE {
         ac-BarringFactor          ENUMERATED {
              ╲__ 203-1          p00, p05, p10, p15, p20, p25, p30, p40,
                                 p50, p60, p70, p75, p80, p85, p90, p95},
         ac-BarringTime ___/ 203-2   ENUMERATED {s4, s8, s16, s32, s64, s128,
                         __ 203-3                s256, s512},
204      ac-BarringForSpecialAC    BIT STRING (SIZE(5))
     }
     ac-BarringConfigLevel2 SEQUENCE {
         ac-BarringFactor          ENUMERATED {
              ╲__ 204-1          p00, p05, p10, p15, p20, p25, p30, p40,
                                 p50, p60, p70, p75, p80, p85, p90, p95},
         ac-BarringTime ___/ 204-2   ENUMERATED {s4, s8, s16, s32, s64, s128,
                         __ 204-3                s256, s512},
205      ac-BarringForSpecialAC    BIT STRING (SIZE(5))
     }
     ac-BarringConfigLevel3 SEQUENCE {
         ac-BarringFactor          ENUMERATED {
              ╲__ 205-1          p00, p05, p10, p15, p20, p25, p30, p40,
                                 p50, p60, p70, p75, p80, p85, p90, p95},
         ac-BarringTime ___/ 205-2   ENUMERATED {s4, s8, s16, s32, s64, s128,
                         __ 205-3                s256, s512},
         ac-BarringForSpecialAC    BIT STRING (SIZE(5))
     }
 }
```

Fig. 2

APPARATUS AND METHOD FOR A MOBILE TELECOMMUNICATIONS SYSTEM

CROSS-REFERENCE TO RELATED APPLICATIONS

The present application is a continuation of U.S. application Ser. No. 16/496,454, filed Sep. 23, 2019, which is based on PCT Filing PCT/EP2018/058105, filed Mar. 29, 2018, which claims priority to EP 17164062.6, filed Mar. 31, 2017, the entire contents of each are incorporated herein by reference.

TECHNICAL FIELD

The present disclosure generally pertains to entities and user equipment of a mobile telecommunications system.

TECHNICAL BACKGROUND

Long Term Evolution ("LTE") is a candidate for providing the requirements of 5G, which is a wireless communication technology allowing high-speed data communications for mobile phones and data terminals and which is already used for 4G mobile telecommunications systems. Other candidates for meeting the 5G requirements are termed New Radio Access Technology Systems (NR).

An NR can be based on LTE technology, just as LTE was based on previous generations of mobile communications technology. LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies. LTE is standardized under the control of 3GPP ("3rd Generation Partnership Project"). There exists a successor LTE-A (LTE Advanced) allowing higher data rates than the basic LTE which is also standardized under the control of 3GPP. For the future, 3GPP plans to further develop LTE-A such that it will be able to fulfill the technical requirements of 5G.

The term "Internet of things" (IoT) denotes the internetworking of physical devices, vehicles, buildings, and other items that are provided with electronics, software, sensors, actuators, and network connectivity that enable these objects to collect and exchange data. Such objects are also referred to as "connected devices" and "smart devices".

Machine-type Communication (MTC) enables IoT devices to exchange information in an autonomous way without human intervention. 3GPP is in the process of improving LTE networks for Machine-type Communication (MTC). Examples are enhanced NB-IoT (eNB-IoT) with new power classes, improved mobility support and multicast messaging, or further enhancements for eMTC (feMTC) including VoLTE support and multicast messaging. These improvements are the next steps in the direction of 5G networks for massive MTC (mMTC).

eMTC (enhanced Machine Type Communication) is a 3GPP IoT technology that supports low-cost and high coverage for such machine-type communication devices. The technology is based on Long Term Evolution ("LTE") and eMTC devices are supported within an LTE host carrier.

With Release 13 of the 3GPP standards LTE-M has been developed for LTE M2M communications. LTE-M introduces new categories known as LTE Cat 1.4 MHz and LTE Cat 200 kHz.

Although there exist signaling techniques for Machine-type Communication (MTC), it is generally desirable to improve the signaling in such technologies.

SUMMARY

According to a first aspect, the disclosure provides an apparatus including circuitry configured to perform a Random Access procedure that is based on one or more access control parameters that are specific for a predefined coverage level.

According to a further aspect, the disclosure provides an apparatus including circuitry configured to broadcast access control parameters that are specific for a predefined coverage level.

According to a further aspect, the disclosure provides a method including performing a Random Access procedure that is based on one or more access control parameters that are specific for a predefined coverage level.

According to a further aspect, the disclosure provides a computer program including instructions, the instructions when executed on a processor performing a Random Access procedure that is based on one or more access control parameters that are specific for a predefined coverage level.

Further aspects are set forth in the dependent claims, the following description and the drawings.

BRIEF DESCRIPTION OF THE DRAWINGS

Embodiments are explained by way of example with respect to the accompanying drawings, in which:

FIG. 2 shows an embodiment of an extended SIB2 information that includes access class barring parameters for per CE level access barring;

DETAILED DESCRIPTION OF EMBODIMENTS

Figure 1:
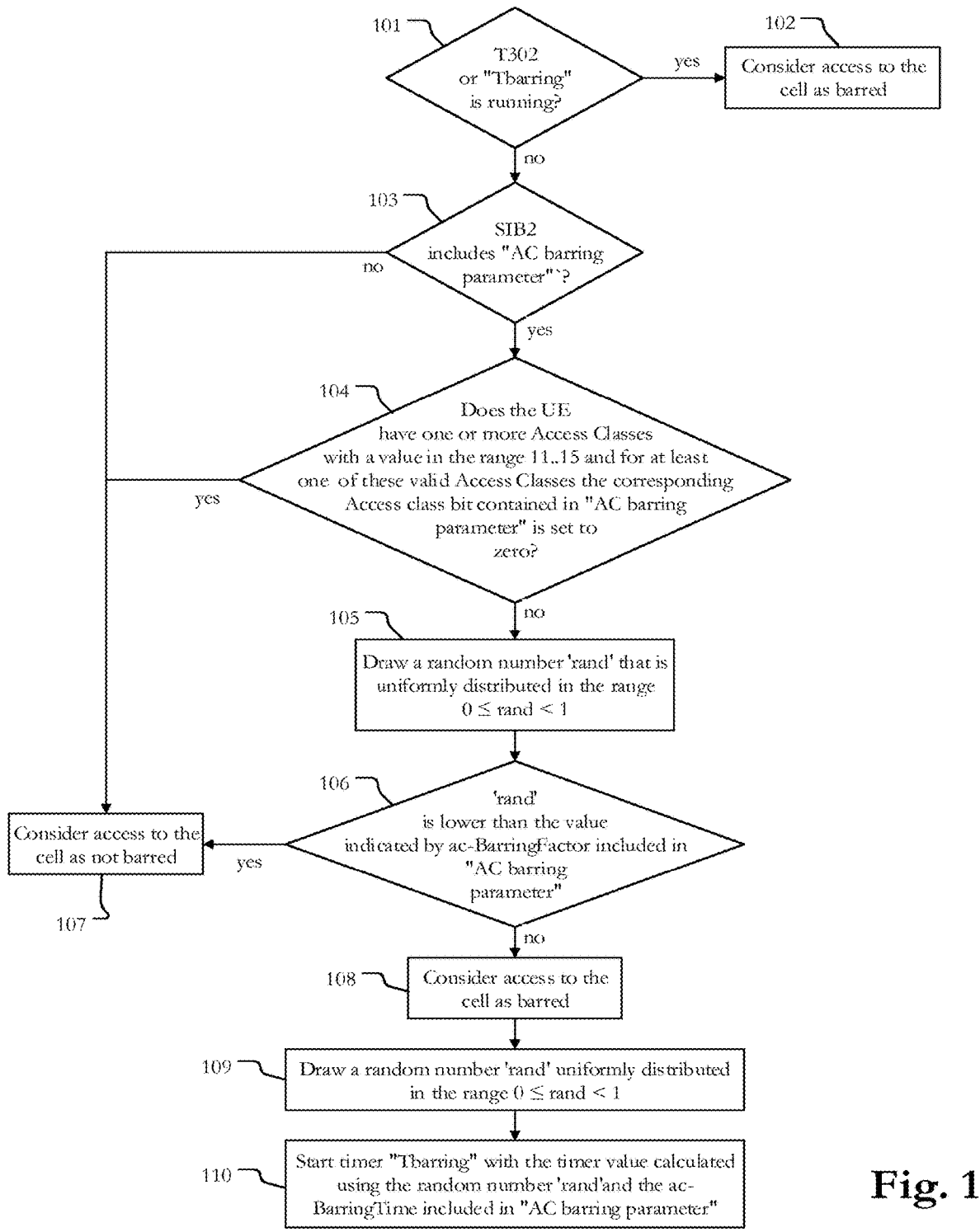
FIG. 1 schematically shows the access barring check defined in TS 36.331.

Before a detailed description of the embodiments under reference of FIG. 1, general explanations are made.

The embodiments relate to an apparatus including circuitry configured to perform a Random Access procedure that is based on one or more access control parameters that are specific for a predefined coverage level.

An apparatus as described in the embodiments may for example be a mobile telecommunications system entity, in particular user equipment, a MTC UE, a base station (eNodeB), or the like. In particular, an apparatus including circuitry configured to perform a Random Access procedure may be a UE or a MTC UE.

An apparatus as described in the embodiments may for example be a 3GPP compliant communication device, e.g. an LTE or advanced LTE type device. The apparatus may for example provide the requirements of 5G or other New Radio Access Technology Systems (NR).

Circuitry may include at least one of: processor, microprocessor, dedicated circuit, memory, storage, radio interface, wireless interface, network interface, or the like, e.g. typical electronic components which are included in a base station, such as an eNodeB.

An apparatus including circuitry configured to perform a Random Access procedure may for example allow for a coverage level based access class barring.

A coverage level may for example be any information that groups measurements (e.g. Reference Signal Received Power (RSRP) measurements) of a user equipment into predefined subsets, so that a user equipment can be attributed to one of the subsets according to its measurement result. A coverage level may for example be a CE level that is defined in the LTE standard. There may for example be four predefined coverage levels, such as CE level 0, CE level 1, CE level 2 and CE level 3. Coverage levels may be standard or enhanced coverage levels.

Coverage levels may also be attributed to coverage modes. For example coverage levels such as CE level 0 and CE level 1 may be attributed to a CE mode A, whereas coverage levels such as CE level 2 and CE level 3 may be attributed to a CE mode B, where CE mode A relates to shallow coverage and CD mode B relates to deep coverage. Deep coverage may in particular relate to UEs or MTE UEs that are located inside of buildings.

As far as the embodiments speak about parameters that are "specific for a predefined coverage level" or "coverage-specific", this may for example refer to parameters that are defined for a specific coverage level (e.g. CE level) or this may refer to parameters that are defined for a specific coverage mode (e.g. CE mode).

Access control parameters may be any parameters that are intended to control the access of user equipment to communication channel such as a Random Access Channel (e.g. RACH, PRACH) or other resources such as a data channel. Access control parameters may for example relate to techniques for access control such as Access Class Barring (ACB), Extended Access Barring (EAB), or Application specific Congestion control for Data Communication (ACDC).

The embodiments disclosed below may apply access barring mechanisms in deep coverage. This may permit a usage of different network policies. Also, the embodiments as described below may result in an improved access/load control of idle mode UEs.

According to embodiments, the circuitry is configured to receive, for one or more predefined coverage levels (e.g. CE level 0, CE level 1, CE level 2, CE level 3), one or more access control parameters that are specific for the respective coverage level.

For example, the circuitry may read the coverage level specific parameters from system information, e.g. from an extended System Information Block 2 (SIB2). A SIB2 extension may for example include per CE level access barring parameters for RA resources and other network resources.

According to embodiments, the circuitry is configured to apply the coverage-specific access control parameters based on its coverage level. For example, a UE may select and apply those coverage-specific access control parameters that are attributed to its own coverage level.

The circuitry may be configured to determine its (respectively a UE's) coverage level by measurement. A measurement may for example be an RSRP measurement and a coverage level may be determined based on RSRP measurements by e.g. computation.

According to embodiments, there are four predefined coverage levels (e.g. CE level 0, CE level 1, CE level 2, CE level 3) and/or there are two predefined coverage modes (e.g. CE mode A, CE mode B). Such coverage levels and/or coverage modes may for example be defined in a standard, e.g. in the LTE standard.

The circuitry may be configured to perform a modified Random Access (RA) procedure in deep coverage and to take coverage level specific access barring parameters into account.

Coverage-specific access control parameters may for example include a coverage-specific barring factor (ac-BarringFactor), a coverage-specific barring time (ac-BarringTime), and/or coverage-specific access class bits (ac-BarringForSpecialAC). The coverage-specific access control parameters may for example include an ac-BarringFactor that controls a random number test of a random access procedure. Still further, the coverage-specific access control parameters may include a parameter ac-BarringTime that is used to calculate the barring time tbarring. Still further, the coverage-specific access control parameters may include a parameter that includes access class bits which control access of UEs on a per CE level basis (e.g. ac-BarringForSpecialAC for special access classes 11 . . . 15).

According to embodiments, the circuitry is configured to perform a coverage level reselection process. The apparatus may for example perform the coverage level reselection process if no Random Access Response is received within the RA Response window, or if the Random Access Response reception is considered not successful.

The circuitry may for example be configured to perform, during the coverage level reselection process, an access barring check for a specific coverage level.

For example, the circuitry may be configured to perform the access barring check when the coverage level changes during a Random Access procedure.

The circuitry may be configured to, if the access barring check for the specific coverage level is not successful, wait for the barring timer for this coverage level to expire and the circuitry may be configured to, if the access barring check for the specific coverage level is successful, select a Random Access Preambles group, a Response Window Size, a Contention Resolution Timer, and/or a PRACH resource corresponding to the selected enhanced coverage level.

Such an access barring check may be performed on the MAC layer.

According to embodiments, the circuitry is configured to terminate a barring timer when the coverage level changes.

The circuitry may be configured to perform RA access barring and, if successful, then perform other resource barring. For example, in a first stage, RA resource barring is checked before initiating the RA procedure; and if it is determined that RA resources are not congested then the UE performs the RA procedure and determines its accurate coverage level and does not apply access barring in the middle of the RA procedure. Once the coverage level has been determined, then the UE performs the access barring check for the accurate coverage level before sending the RRC connection Request or Msg3. Thus, RRC and MAC layer independence may be maintained.

According to embodiments, the circuitry is configured to perform a higher accurate RSRP measurement if AC barring parameters are set for a particular coverage level. For example, an indication to perform precise measurements in order to determine an accurate coverage level may be used and corresponding barring parameters may be applied.

The embodiments also disclose an apparatus including circuitry that is configured to broadcast access control parameters that are specific for a predefined CE level. Such an apparatus may for example be a network entity such as a base station (eNodeB, eNB), or the like. The circuitry of such an apparatus may be configured to choose the access control parameters such that coverage level access barring prefers deep coverage UEs over shallow coverage UEs.

The circuitry may also be configured to apply coverage-specific access class barring to RA resources only. Accordingly, CE level access barring may allow deep coverage UEs, if operators are interested in creating extra revenue from deep coverage UEs, and in this case the network may, in case of congestion, bar more of the shallow coverage UEs.

The embodiments also disclose a method including performing a Random Access (RA) procedure that is based on one or more access control parameters that are specific for a predefined coverage level.

The embodiments also disclose a computer program including instructions, the instructions when executed on a processor performing a Random Access (RA) procedure that is based on one or more access control parameters that are specific for a predefined coverage level.

The embodiments also disclose a machine-readable medium storing such a computer program.

LTE Access Class Barring

The Random Access Channel (RACH) is a common transport channel in the uplink that is mapped one-to-one onto physical channels (PRACHs). The main purpose of Random Access Procedure is to achieve uplink synchronization and to obtain a grant for initial attach.

When UE sends the very first message of random access procedure to some network, it basically sends a specific pattern or signature which is called RACH preamble. The preamble value differentiate requests coming from different UEs. If two UEs use the same RACH preambles at the same time then there can be collision. To resolve the problem of RA congestion in LTE systems, different solutions are applied.

Basic information about the Random Access Procedure such as access barring parameters are informed to a UE via SIB2. If access barring parameters are broadcasted in SIB2 and UE has associated access class (0 . . . 15 whereby 0 . . . 9 are normal ACs and 10 and beyond are special ACs.), which is currently barred, then the UE draws a random number and compares it with a broadcasted barring factor value. If the number is higher than the broadcasted value, then the UE considers access to the cell is barred otherwise access is not barred. This is specified in section 5.3.3.11 "Access barring check" of [1] (TS 36.331).

FIG. 1 schematically shows the access barring check defined in section 5.3.3.11 "Access barring check" of [1] (TS 36.331). At 101 it is tested if a timer T302 or "Tbarring" is running. If yes, the process proceeds at 102, if no, the process proceeds at 103. At 102, access to the cell is considered as barred. At 103, it is tested if SIB2 includes the information element "AC barring parameters". If yes, the process proceeds at 104, if no, the process proceeds at 107. At 104, it is tested if the UE has one or more Access Classes as stored on the USIM with a value in the range 11 . . . 15, which is valid for the UE to use according to TS 22.011 [3] and TS 23.122 [4] (ACs 12, 13, 14 are only valid for use in the home country and ACs 11, 15 are only valid for use in the HPLMN/EHPLMN). At 104, it is further tested if for at least one of these valid Access Classes the corresponding bit in the ac-BarringForSpecialAC information element contained in "AC barring parameter" information element (ac-BarringConfig in FIG. 2) is set to zero. If yes, the process proceeds at 107, if no, the process proceeds at 105. At 107, access to the cell is considered as not barred. At 105, a random number 'rand' uniformly distributed in the range: 0≤rand<1 is drawn and the process proceeds at 106. At 106, it is tested if 'rand' is lower than the value indicated by ac-BarringFactor included in "AC barring parameter". If yes, the process proceeds at 107, if no, the process proceeds at 108. As already described above, at 107, access to the cell is considered as not barred. At 108, access to the cell is considered as barred and the process proceeds at 109. At 109, (access to the cell is barred and both timers T302 and "Tbarring" are not running) a random number 'rand' that is uniformly distributed in the range 0≤rand<1 is drawn and the process proceeds at 110. At 110, a timer "Tbarring" is started with the timer value calculated as follows, using the ac-BarringTime included in "AC barring parameter": "Tbarring"=(0.7+0.6*rand)*ac-BarringTime. As described with regard to 101 and 102, access to the cell is considered as barred as long as this timer "Tbarring" is running. The timer T302 is used to delay the RRC connection setup repetitions, and timer "Tbarring" is used as a random backoff timer.

That is, for regular UEs with AC 0-9, the test at 104 fails. Their access is controlled by ac-BarringFactor and ac-BarringTime. The UE generates a random number (105 in FIG. 1)—"rand" generated by the UE has to pass the "persistent" test (106 in FIG. 1) in order for the UE to access. By setting ac-BarringFactor to a lower value, the access for regular ACs is restricted (UE must generate a "rand" that is lower than the threshold in order to access) while priority users with AC 11-15 can access without any restriction if the corresponding AC bit is set.

EAB, Extended Access Barring mechanism introduced for MTC devices, is also based on access classes but also has EAB categories (a,b,c) in addition.

NB-IoT access barring is also based on access classes. However, ACDC (Application specific Congestion control for Data Communication) which provides service specific access barring works on ACDC categories (16 categories per PLMN) and not on ACs.

Access barring applies to the following types of calls and has associated barring time and factor and applied per PLMN: Emergency calls, MO-signaling, MO-Data, MMTEL voice, MMTEL video, CSFB, and Unattended data transmission. Technically, all types listed above should be applicable to MTC UEs in different coverage areas.

Coverage Enhancements

In LTE, category information is used to allow the eNB to communicate effectively with all the UEs connected to it. The UE categories define combined uplink and downlink capabilities. eMTC (which is also known as LTE-M) introduces coverage enhancements (CE) in category M.

Coverage enhancements can extend the range of a cell or improve signal penetration into buildings. There are two coverage enhancement modes, CE Mode A and CE Mode B. The main difference between Mode A and Mode B is that Coverage Enhancement Mode A supports only moderate coverage enhancements whereas Mode B supports deep coverage. These two modes are specified for RRC Connected state and they provide up to 15 dB enhancement using a variety of techniques such as subframe repetition, frequency hopping, boosting the reference symbols, and enhanced PRACH, as well as increasing transmit power. Since the two modes CE Mode A and CE Mode B are specified for RRC Connected state, they are configured by the eNB.

As it is explained in [6], which CE mode to use may be dependent upon the CE level (repetition level). For example: Mode A and B each support a different maximum number of sub frame repetitions. In CE Mode A there are no repetitions or a small number of repetitions. Operation in CE Mode A would have an equivalent coverage as that of UE Category 1. The difference in coverage between LC-MTC and UE Category 1 due to 1 Rx, 6 PRB narrowband and reduced uplink transmit power in LC-MTC is compensated by utilizing a small number of repetitions.

In CE Mode B there are a large number of repetitions. An MTC UE operating in CE Mode B has coverage of up to 15 dB coverage enhancement with reference to that of UE Category 1. CE Mode B is targeted at devices that are stationary (or with limited mobility) and inside buildings where the assumed use case is for smart meters operating in basements. It should be appreciated that the range of Rel-13 LC-MTC applications is not just for stationary smart meters in basements but rather for a large range of other applications such as smart watches, wearable devices, smart sensors, etc. For applications other than unfortunate smart meters in basements, deep coverage is unlikely to be used and moderate mobility is expected.

For example, according to [7], if the most recent PRACH CE level for the UE is 0 or 1, the contents of the Random Access Response Grant are interpreted according to CE Mode A. If the most recent PRACH CE level for the UE is 2 or 3, the contents of the Random Access Response Grant are interpreted according to CE Mode B. Still further, according to [2], the preambles are contained in Random Access Preambles groups for each CE level. That is, UEs in the same CE level use the same RACH resources.

Per CE Level ACB

It is assumed that existing techniques for access control such as ACB, EAB, or ACDC described above will work well for CE mode A. However, per CE level ACB can provide better control. So the embodiments described below are related to the details of introducing "per CE level" ACB (ACB with CE level specific parameters).

The embodiments described below introduce a possibility for the network to broadcast per CE level access control parameters (e.g. ACB/EAB/ACDC). This approach of per CE level access barring allows the network flexibility to e.g. allow a maximum number of UEs to access the network/cell by e.g. not permitting or permitting only a low number of deep coverage UEs. Still further, CE level access barring may allow deep coverage UEs, if operators are interested in creating extra revenue from deep coverage UEs, and in this case the network may, in case of congestion, bar more of the shallow coverage UEs.

An MTC UE will read the above parameters in the extended SIB2 and apply barring parameters based on its coverage level.

FIG. 2 shows an embodiment of an extended SIB2 information that includes access class barring parameters for per CE level access barring. The SIB2 information includes an information element AC-BarringConfig 201. This IE AC-BarringConfig 201 includes an ac-BarringConfigLevel0 IE 202 that carries access class barring parameters for CE level 0 UEs, an ac-BarringConfigLevel1 IE 203 that carries access class barring parameters for CE level 1 UEs, an ac-BarringConfigLevel2 IE 204 that carries access class barring parameters for CE level 2 UEs, and an ac-BarringConfigLevel3 IE 205 that carries access class barring parameters for CE level 3 UEs.

The ac-BarringConfigLevel0 IE 202 carries access class barring parameters for CE level 0 UEs, namely ac-BarringFactor 202-1, ac-BarringTime 202-2 and ac-BarringForSpecialAC 202-3. The IE ac-BarringFactor 203-1 controls the random number test of the random access procedure (105 and 106 in FIG. 1) for CE level 0 UEs. If the random number drawn (105 in FIG. 1) by a CE level 0 UE is lower than this value ac-BarringFactor 202-1, access is considered as allowed by the CE level 0 UE. Otherwise, access is considered as barred by the CE level 0 UE. The values of ac-BarringFactor 203-1 of the type ENUMERATED {p00, p05, p10, p15, p20, p25, p30, p40, p50, p60, p70, p75, p80, p85, p90, p95} are interpreted in the range [0,1): p00=0, p05=0.05, p10=0.10, . . . , p95=0.95. The parameter ac-BarringTime 202-2 of type ENUMERATED {s4, s8, s16, s32, s64, s128, s256, s512} is used to calculate the barring time tbarring (110 in FIG. 1). The parameter ac-BarringForSpecialAC 202-3 of the type BIT STRING (SIZE(5)) is a string of 5 bits that control access of CE Level 0 UEs with AC 11-15. A CE level 0 UE that has one or more ACs with a value in the range 11 . . . 15 and for at least one of these valid ACs the corresponding AC bit contained in ac-BarringForSpecialAC 202-3 is set will consider access to the cell as not barred (see 104 in FIG. 1).

The ac-BarringConfigLevel1 IE 203 carries corresponding access class barring parameters for CE level 1 UEs, namely ac-BarringFactor 203-1, ac-BarringTime 203-2 and ac-BarringForSpecialAC 203-3. The ac-BarringConfigLevel2 IE 203 carries corresponding access class barring parameters for CE level 2 UEs, namely ac-BarringFactor 204-1, ac-BarringTime 204-2 and ac-BarringForSpecialAC 204-3. The ac-BarringConfigLevel3 IE 205 carries corresponding access class barring parameters for CE level 3 UEs, namely ac-BarringFactor 205-1, ac-BarringTime 205-2 and ac-BarringForSpecialAC 205-3. Concerning the description of these parameters, it is referred to the above description with regard to ac-BarringConfigLevel0 202.

The design of parameters AC-BarringConfigLevel0 could be based on the current specifications. For example, the same information element that is defined in [1] and [2] as AC-BarringConfig may be used as AC-BarringConfigLevel0. The same applies for AC-BarringConfigLevel1, ACBarringConfigLevel2, and AC-BarringConfigLevel3.

For example, AC-BarringConfig as defined in [1] and [2] may be used to transport the AC Parameters for CE level 0 and three additional information elements of the same structure may be added to SIB2 in order to transport the respective AC parameters for CE levels 1, 2 and 3.

The skilled person will be aware that any deviations from this embodiment with regard to the number of CE levels, the position of the parameters in the information elements and the precise structure of the information elements are within his common general knowledge. The disclosure is thus not limited to the specific example given above.

In the above embodiment the ACB mechanism of [1], [2] has been adapted in view of the per CE level aspect. This disclosure is, however, not restricted to ACB parameters. In alternative embodiments, EAB parameters are broadcast per CE level, and in yet other embodiments ACDC parameters, or any combinations of such parameters are broadcast per CE level. In yet other embodiments only some of the access mechanisms are realized per CE level, e.g. ACB parameters may not be broadcast per CE level but EAB parameters are, or only ACDC parameters are broadcast per CE level.

CE Level "Reselection" and Access Class Barring

There is a problem with RSRP measurement accuracy when UE is in deep coverage and UE may not be aware of its accurate CE level. For example, all UEs in CE mode B may judge their presence in CE level 2 as shown in FIG. 3.

Figure 3:
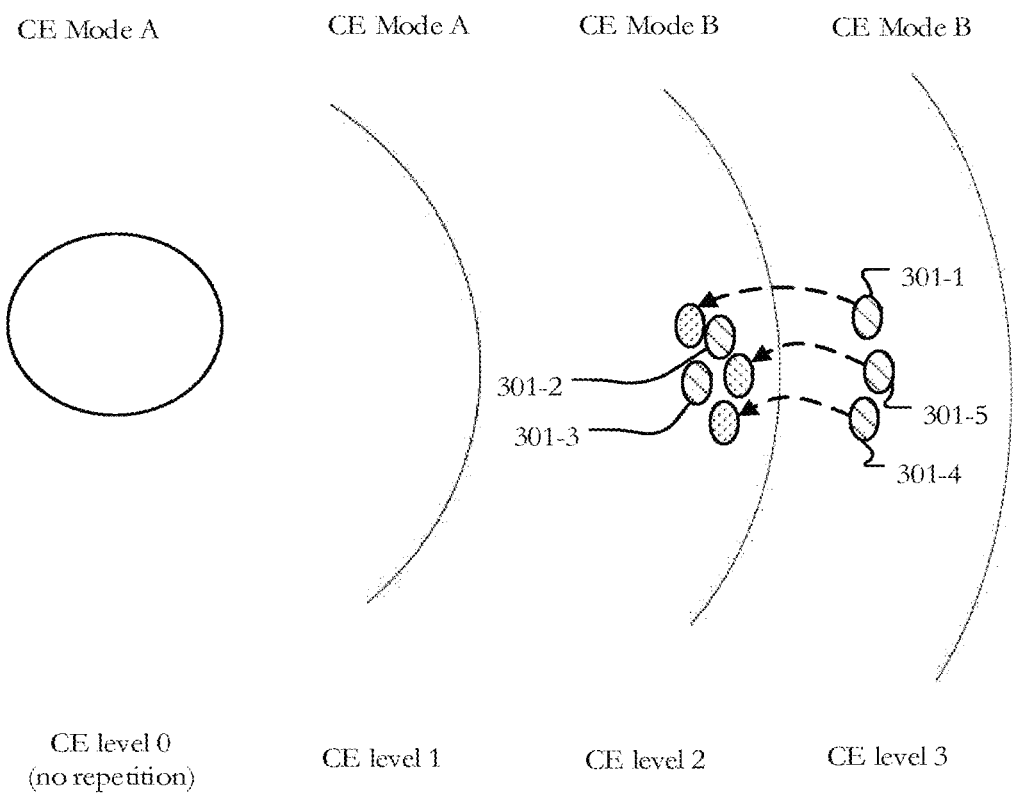
FIG. 3 shows an example of an erroneous CE level judgement.

FIG. 3 shows an example of an erroneous CE level judgement. Due to the abnormality of RSRP measurements some of UEs 301-1, 301-2, 301-3, 301-4, 301-5 have erroneously judge their position in CE level 2 even if the actual level is CE level 3. As indicated by the dashed arrows in FIG. 3, in the given example, UEs 301-1, 301-4 and 301-5 have erroneously judged their position in CE level 2. This overloads RACH resources partitioned for CE level 2 as these preambles will be used by all UEs 301-1, 301-2, 301-3, 301-4, 301-5 which judge their presence in CE level 2. If Random Access (RA) resource overload happens, then a backoff timer is sent in the Random Access Response (RAR). But the RA preamble will be repeated many times and the probability of collision will be higher. So, it is beneficial if the network sets access barring parameters per CE level and dimension RA resources accordingly.

After successful RA procedure these UEs will get distributed between CE level 2 and CE level 3. This CE level "reselection" is part of the current RACH procedure as described in [2] (TS 36.321).

Figure 4:
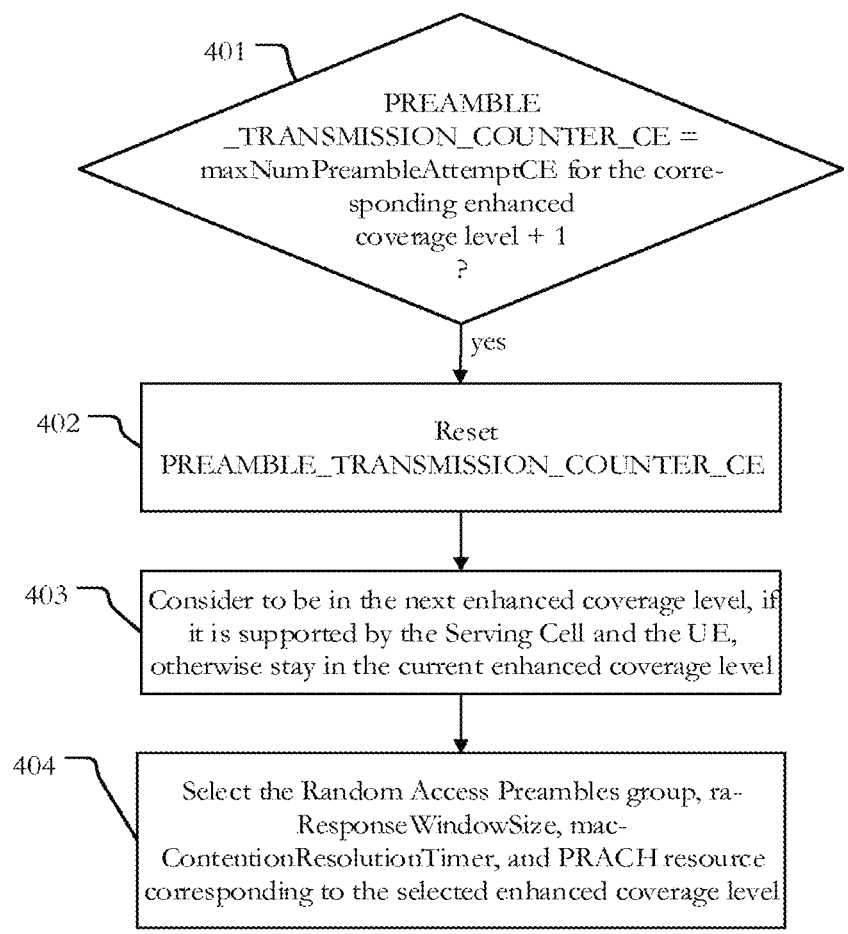
FIG. 4 shows the aspect of CE level "reselection" of the RACH procedure as defined in the standard.

FIG. 4 shows the aspect of CE level "reselection" of the RACH procedure as defined in section 5.1.4 of [2] (TS 36.321). According to this procedure, if no Random Access Response is received within the RA Response window, or if none of all received Random Access Responses contains a Random Access Preamble identifier corresponding to the transmitted Random Access Preamble, the Random Access Response reception is considered not successful and the MAC entity proceeds as follows: At 401, it is determined if PREAMBLE_TRANSMISSION_COUNTER_CE= maxNumPreambleAttemptCE for the corresponding enhanced coverage level+1. If this is determined to the positive, the process proceeds at 402. At 402, the PREAMBLE_TRANSMISSION_COUNTER_CE is reset and the process proceeds at 403. At 403, the MAC entity considers to be in the next enhanced coverage level, if it is supported by the Serving Cell and the UE, otherwise the MAC entity stays in the current enhanced coverage level and the process proceeds at 404. At 404, the MAC entity selects the Random Access Preambles group, ra-ResponseWindowSize, mac-ContentionResolutionTimer, and PRACH resource corresponding to the selected enhanced coverage level.

According to this RACH procedure, UEs in CE level 3 will require more repetitions compared to Rep level 2 and hence a UE in Rep level 3 will be utilizing more radio resources than a UE in CE level 2.

Figure 5:
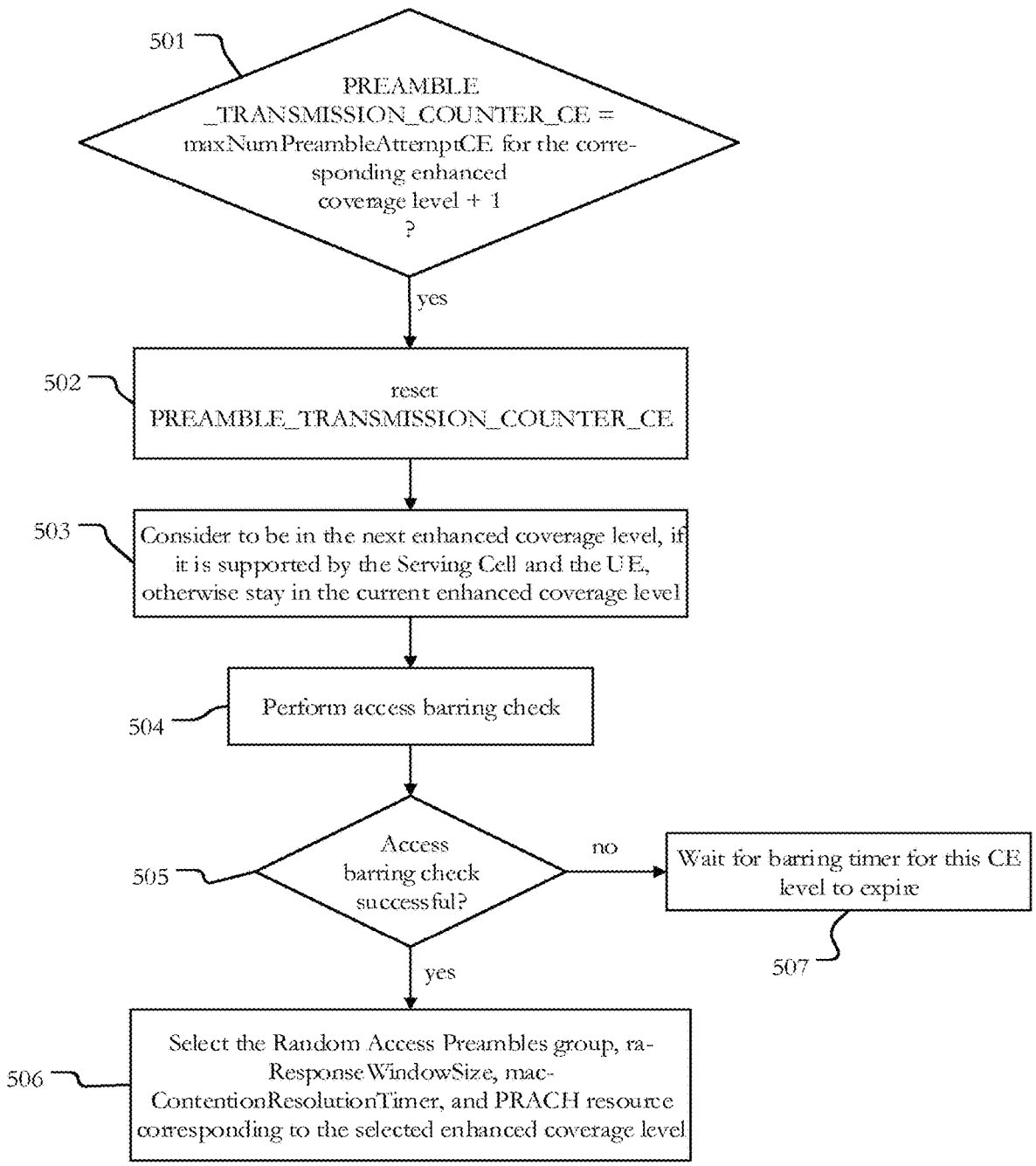
FIG. 5 shows an embodiment of a modified RACH procedure.

FIG. 5 shows an embodiment of a modified RACH procedure. This modified RACH procedure is based on the RACH procedure as described in [2] (TS 36.321) described above. However, if no Random Access Response is received within the RA Response window, or if none of all received Random Access Responses contains a Random Access Preamble identifier corresponding to the transmitted Random Access Preamble, the Random Access Response reception is considered not successful and the MAC entity proceeds as follows: At 501, it is determined if PREAMBLE_TRANSMISSION_COUNTER_CE=maxNumPreambleAttemptCE for the corresponding enhanced coverage level+1. If this is determined to the positive, the process proceeds at 502. At 502, the PREAMBLE_TRANSMISSION_COUNTER_CE is reset and the process proceeds at 503. At 503, the MAX entity considers to be in the next enhanced coverage level, if it is supported by the Serving Cell and the UE, otherwise the MAC entity stays in the current enhanced coverage level and the process proceeds at 504. At 504, the access barring check as described with regard to FIG. 1 is performed on per CE level basis and the process proceeds at 505. If, at 505, it is determined that the access barring check was successful, then the process proceeds at 506. At 506, the MAC entity selects the Random Access Preambles group, ra-ResponseWindowSize, mac-ContentionResolutionTimer, and PRACH resource corresponding to the selected enhanced coverage level. If, at 505, it is determined that the access barring check was not successful, then the process proceeds at 507. At 507, the MAC entity waits for the barring timer for this CE level to expire.

According to this embodiment, the access class barring parameters (ACB/EAB/ACDC) are checked when CE level changes in the UE during the RA procedure. For example, when the UE moves from CE level 2 to CE level 3, the UE checks if it is allowed to access in CE level 3 if network broadcasted ACB/EAB/ACDC parameters for CE level 3. If the UE is barred, then it shall not send RA preamble and wait for barring timer for this CE level to expire. According to this process, the UE needs to draw a random number (105 in FIG. 1) and compare it with the broadcasted number (106 in FIG. 1).

It is assumed that the UE will not re-read SIB2 to find out new barring parameters if it changes the coverage level. The UE will acquire SIB2 in one go and apply different parameters and try to avoid decoding of multiple transmissions of SIB2. However, access barring may change or different versions of a SIB2 or a new SIB may be broadcasted in different CE modes or levels. So, according to alternative embodiments, a UE may also be configured to re-acquire SIB2 for new AC parameters when changing CE level (or CE mode).

Access Barring Check and CE Level Change

Figure 6:
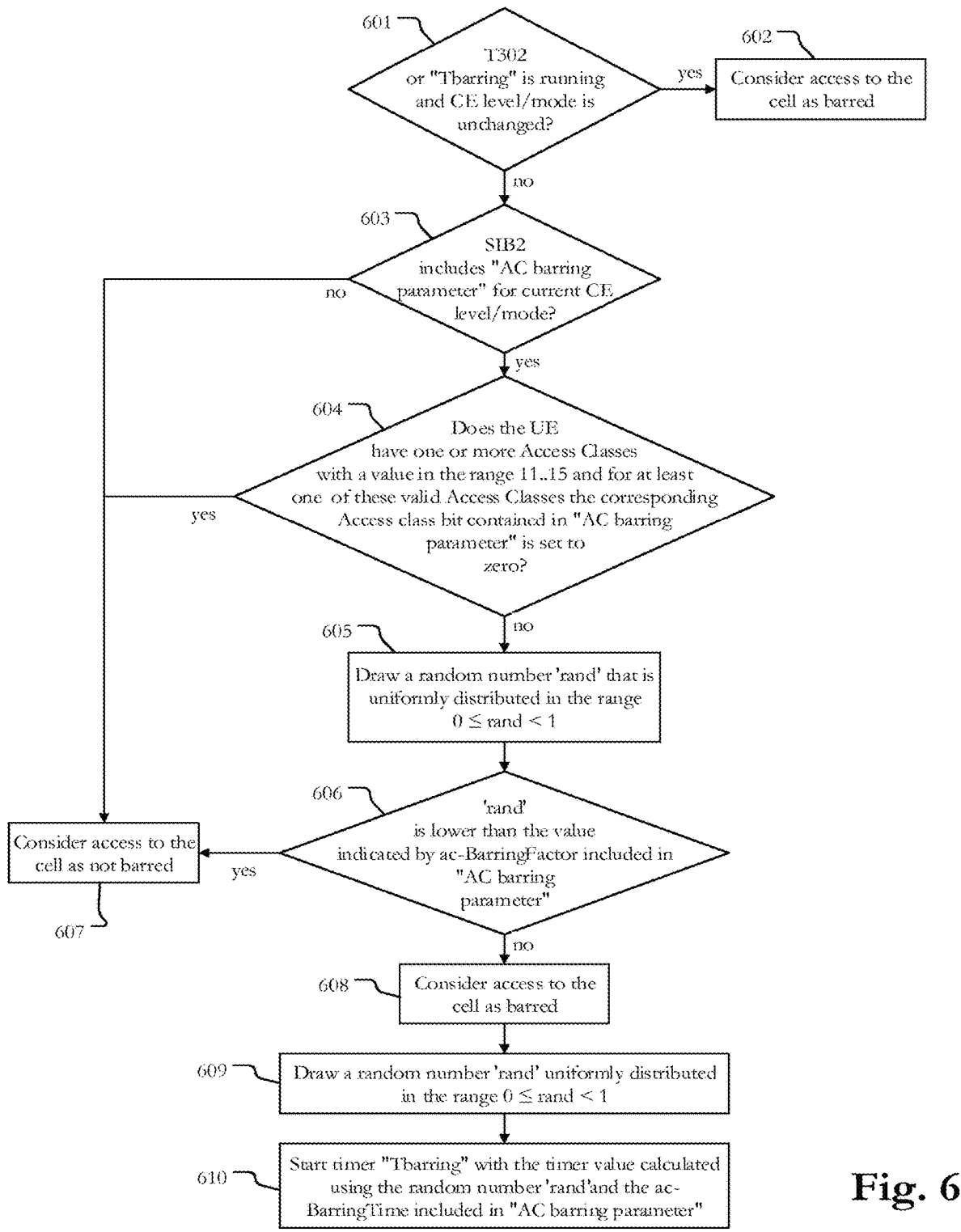
FIG. 6 shows an embodiment of a modified access barring check.

FIG. 6 shows an embodiment of a modified access barring check. The process of FIG. 6 corresponds to that of FIG. 1. At 601 it is tested if timer T302 or "Tbarring" is running and CE level (respectively the CE mode) is unchanged. If yes, the process proceeds at 602, if no, the process proceeds at 603. At 602, access to the cell is considered as barred. At 603, it is tested if SIB2 includes the information element "AC barring parameters" for the current CE level/mode. If yes, the process proceeds at 604, if no, the process proceeds at 607. At 604, it is tested if the UE has one or more Access Classes, as stored on the USIM, with a value in the range 11 . . . 15, which is valid for the UE to use. At 604, it is further tested if for at least one of these valid Access Classes the corresponding bit in the ac-BarringForSpecialAC information element contained in "AC barring parameter" information element for the current CE mode is set to zero. If yes, the process proceeds at 607, if no, the process proceeds at 605. The processes at 605, 606, 607, 608, 609 and 610 correspond to those of FIG. 1. According to this embodiment, if a UE moved from CE level 2 (CE mode B) to CE level 1 (CE mode A) during a timespan when the barring timer has been running, then the UE checks access barring parameters for CE level 1 (CE mode A) (603 in FIG. 6) and terminates the barring timer earlier (601 in FIG. 6). As, according to this embodiment, barring factor and barring time may be different in different CE modes a the network may bar a higher number of UEs in deep coverage (due to repetitions) rather than in shallow coverage.

Similarly, it is also possible that the UE is barred in one CE level and has ac-barring timer running. But then UE moves into a different CE level and has different barring parameters or no barring. Here, the UE should attempt the access barring check as per new parameters and stop the ac-barring timer related to the previous CE level. The above example is more suitable for the case when e.g. the UE moves CE levels within CE mode A. It may not be relevant to CE mode B due to measurement inaccuracy but, in general, the procedure may apply to all CE levels.

In the embodiments described above, the barring timer is terminated when there is a change of the CE level. In alternative embodiments, however, the barring timer is applicable across all CE levels/modes, i.e. the MAC entity waits until the barring timer has elapsed and only then tries to reconnect based on the new barring parameters of the new CE level.

Two Stage Access Class Barring Per CE Level

Figure 7:
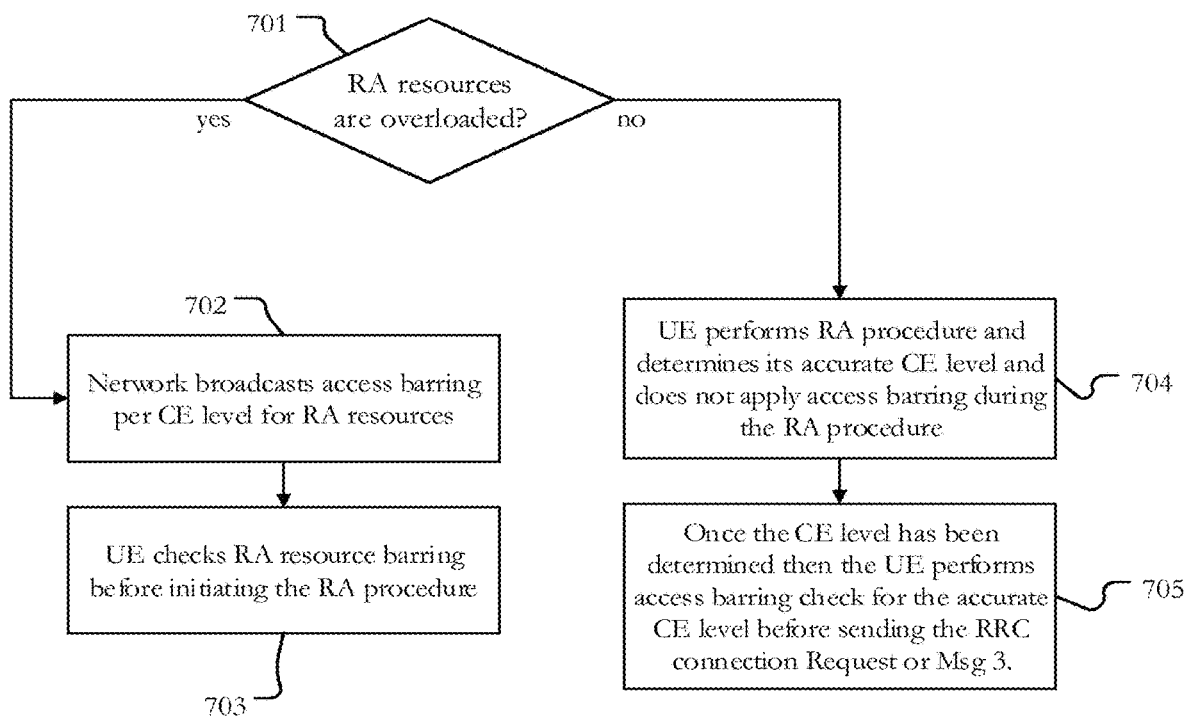
FIG. 7 shows an embodiment of a two stage access class barring per CE level.

FIG. 7 shows an embodiment of a two stage access class barring per CE level.

According to a first aspect of this embodiment, access class barring per CE level is applicable to RA resources only. At 701, the network checks if RA resources are overloaded. If yes, the process proceeds at 702, if no, the process proceeds at 704. At 701, the network broadcasts access barring per CE level for RA resources and then proceeds at 703. At 703, the UE checks RA resource barring before initiating the RA procedure. This will allow flexibility on the network side to configure access barring for partitioned RA resources which are most likely to get overloaded. This may for example avoid overload of RA resources in CE level 2 as described above in the context of FIG. 3 by e.g. barring more CE level 2 UEs and not barring other RA resource partitions (e.g. CE level 0 and CE level 1).

According to a second aspect of this embodiment, if it is determined at 701 that RA resources are not congested (for example because access barring related to RA resources has been successful) then, at 704, the UE performs the RA procedure and determines its accurate CE level and does not apply access barring during the RA procedure. Once the CE level has been determined then, at 705, the UE performs the access barring check for the accurate CE level before sending the RRC connection Request (Msg 3).

A benefit of this approach is that layer independence can be maintained. Access barring is specified in the RRC layer and the RA procedure is specified in the MAC layer. There will be no need to modify MAC behavior while introducing per CE level access barring in RRC. RRC connection Request (Msg 3) is an RRC message and barring can be applied in RRC. The random access preamble transmission to the eNB (Msg 1 transmission), which is subjected to access barring, is also triggered by RRC sublayer. However, the UE will perform RA procedure even if it should be barred.

More Accurate RSRP Measurement

As described previously, the UE's RSRP measurement is not accurate at deep coverage, e.g. at CE Level 2 and 3 since the SNR is very low. One way to obtain an accurate measurement is to accumulate more CRS samples or make use of other known signals such as PSS/SSS and PBCH.

Figure 8:
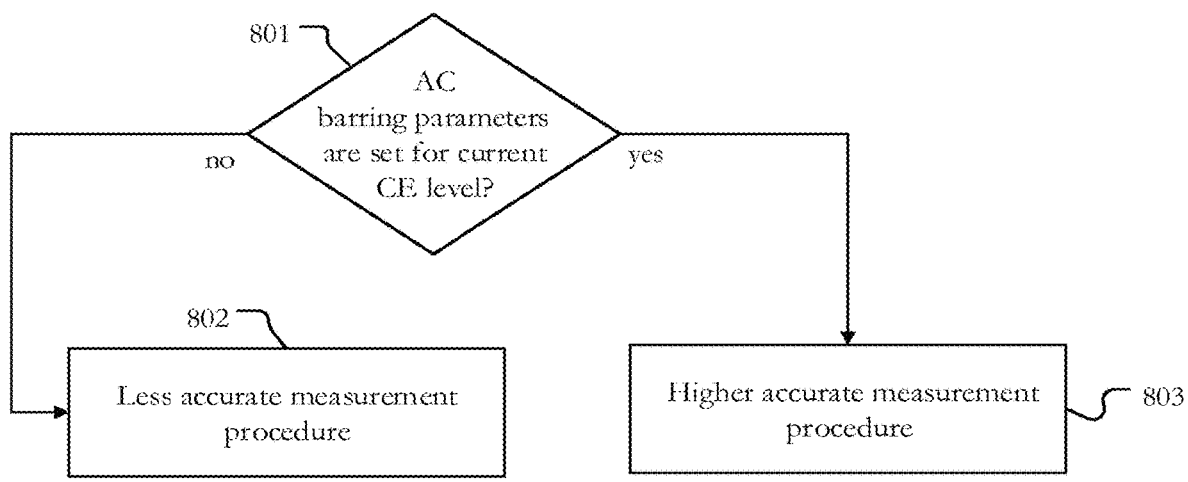
FIG. 8 shows an embodiment in which a higher accurate RSRP measurement is performed if the AC barring parameters are set for a particular CE level.

Hence, FIG. 8 shows an embodiment in which a more accurate RSRP measurement is performed if the AC barring parameters are set for a particular CE level. At 801, the UE checks if the AC barring parameters are set for a particular CE level (the current CE level of the UE). If yes, the process proceeds at 803, if no, the process proceeds at 802. At 803, the UE switches to a more accurate measurement procedure in which it may take longer to perform the measurement. Such a performance can be specified in RAN4. At 802 (AC barring is not enabled) the UE reverts back to the less accurate measurement. This recognizes that without AC barring the UE would perform PRACH ramping and move through the different CE levels. However, if AC barring is enabled, the UE will not be able to move through the different CE levels as per the embodiment above and therefore it is beneficial to use more measurement samples (i.e. also power) to obtain a more accurate measurement.

Increased Barring Time

According to another embodiment, the TBarring parameter is increased beyond the value of 512 seconds currently specified in the standard and e.g. two or more additional values such as 1024s, 2048s, 4096s, 8192s are added so that network is able to bar deep coverage UEs for longer time considering repetitions. According to this embodiment, the value range for TBarring is enhanced for all CE levels so flexibility is provided to the network side to barr UEs in different CE levels for different time-periods, independently. However, in other embodiments, the value range of TBarring may only be enhanced for deep coverage CE levels.

CE Level Dependent Barring Time

According to yet another embodiment, the TBarring parameter is scaled up with the CE level. For example, the formula (0.7+0.6*rand)*ac-BarringTime (610 in in FIG. 6 and corresponding description above) may be modified to multiply by the CE level: [(0.7+0.6*rand)*ac-BarringTime.] *CE Level (1,2,3) or any other constant value scaling up with the CE level.

Implementation

In the following, an embodiment of a general purpose computer 130 is described under reference of FIG. 9. The computer 130 can be implemented such that it can basically function as any type of apparatus or entity, base station or new radio base station, transmission and reception point, or user equipment as described herein. The computer has components 131 to 140, which can form a circuitry, such as any one of the circuitries of the entities, base stations, and user equipment, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140, which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise when it functions as a base station, and user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

Figure 9:
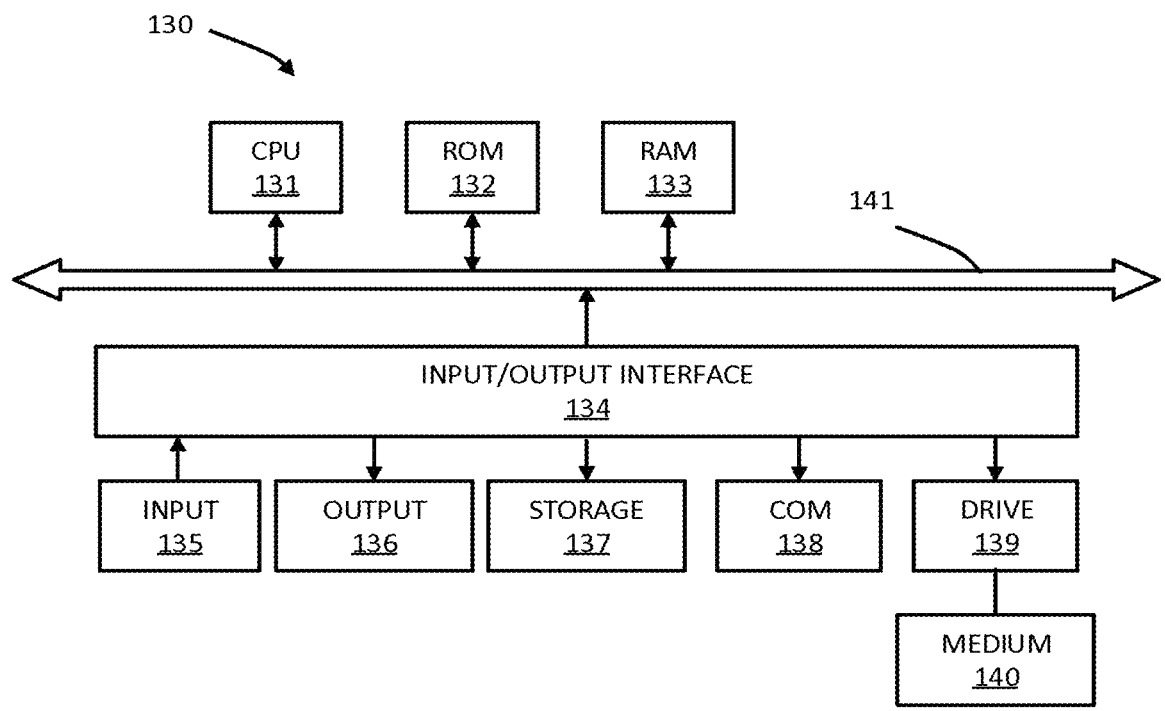
FIG. 9 shows an embodiment of a general purpose computer that can function as any type of apparatus or entity, base station or new radio base station, transmission and reception point, or user equipment as described herein.

It should also be noted that the division of the control or circuitry of FIG. 9 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus comprising circuitry configured to perform a Random Access procedure that is based on one or more access control parameters (AC-BarringConfigLevel0, ACBarringConfigLevel1, AC-BarringConfigLevel2, AC-BarringConfigLevel3) that are specific for a predefined coverage level (CE level 0, CE level 1, CE level 2, CE level 3).

(2) The apparatus of (1), wherein the circuitry is configured to receive, for one or more predefined coverage levels (CE level 0, CE level 1, CE level 2, CE level 3), one or more access control parameters (AC-BarringConfigLevel0, AC-BarringConfigLevel1, AC-BarringConfigLevel2, ACBarringConfigLevel3) that are specific for the respective coverage level.

(3) The apparatus of (1) or (2), wherein the circuitry is configured to apply the coverage-specific access control parameters (AC-BarringConfigLevel0, AC-BarringConfigLevel1, ACBarringConfigLevel2, AC-BarringConfigLevel3) based on its coverage level (CE level 0, CE level 1, CE level 2, CE level 3).

(4) The apparatus of anyone of (1) to (3), wherein the circuitry is configured to determine its coverage level (CE level 0, CE level 1, CE level 2, CE level 3) by measurement (RSRP).

(5) The apparatus of anyone of (1) to (4), wherein there are four predefined coverage levels (CE level 0, CE level 1, CE level 2, CE level 3) and/or there are two predefined coverage modes (CE mode A, CE mode B).

(6) The apparatus of anyone of (1) to (5), wherein a barring time (tbarring) depends on the coverage level.

(7) The apparatus of anyone of (1) to (6), wherein the circuitry is configured to perform a modified Random Access (RA) procedure in enhanced coverage and to take coverage level specific access barring parameters into account.

(8) The apparatus of anyone of (1) to (7), wherein the coverage-specific access control parameters (AC-BarringConfigLevel0, AC-BarringConfigLevel1, AC-BarringConfigLevel2, ACBarringConfigLevel3) comprise a coverage-specific barring factor (ac-BarringFactor), a coverage-specific barring time (ac-BarringTime), and/or coverage-specific access class bits (ac-BarringForSpecialAC).

(9) The apparatus of anyone of (1) to (8), wherein the circuitry is configured to perform a coverage level reselection process.

The apparatus may for example perform the coverage level reselection process if no Random Access Response is received within the RA Response window, or if the Random Access Response reception is considered not successful.

(10) The apparatus of (9), wherein the circuitry is configured to perform an access barring check for a specific coverage level within a coverage level reselection process.

(11) The apparatus of (10), wherein the circuitry is configured to perform the access barring check when the coverage level changes during a Random Access procedure.

(12) The apparatus of anyone of (10) or (11), wherein the circuitry is configured to, if the access barring check for the specific coverage level is not successful, wait for the barring timer for this coverage level to expire.

(13) The apparatus of anyone of (10) to (12), wherein the circuitry is configured to, if the access barring check for the specific coverage level is successful, select a Random Access Preambles group, a Response Window Size, a Contention Resolution Timer, and/or a PRACH resource corresponding to the selected enhanced coverage level.

(14) The apparatus of anyone of (10) to (13), wherein the access barring check is performed on the MAC layer.

(15) The apparatus of anyone of (1) to (14), wherein the circuitry is configured to terminate a barring timer when the coverage level changes.

(16) The apparatus of anyone of (1) to (15), wherein the circuitry is configured to perform RA access barring and, if successful, then perform other resource barring.

(17) The apparatus of (16), wherein RRC and MAC layer independence is maintained.

(18) The apparatus of anyone of (1) to (17), wherein the circuitry is configured to perform a more accurate RSRP measurement if AC barring parameters are set for a particular coverage level.

(19) The apparatus of anyone of (1) to (18), wherein the apparatus is a user equipment.

(20) An apparatus comprising circuitry configured to broadcast access control parameters that are specific for a predefined coverage level.

(21) The apparatus of (20), wherein the circuitry is configured to choose the access control parameters such that coverage level access barring prefers deep coverage UEs over shallow coverage UEs.

(22) The apparatus of (20) or (21), wherein the circuitry is configured to apply coverage-specific access class barring to RA resources only.

(23) The apparatus of anyone of (20) to (22), wherein the apparatus is a network entity such as a base station.

(24) Method comprising performing a Random Access (RA) procedure that is based on one or more access control parameters (AC-BarringConfigLevel0, AC-BarringConfigLevel1, ACBarringConfigLevel2, AC-BarringConfigLevel3) that are specific for a predefined coverage level (CE level 0, CE level 1, CE level 2, CE level 3).

(25) Computer program including instructions, the instructions when executed on a processor performing a Random Access (RA) procedure that is based on one or more access control parameters (AC-BarringConfigLevel0, AC-BarringConfigLevel1, AC-BarringConfigLevel2, ACBarringConfigLevel3) that are specific for a predefined coverage level (CE level 0, CE level 1, CE level 2, CE level 3).

(26) A non-transitory computer-readable recording medium that stores therein a computer program product, which, when executed by a processor, causes the method according to (24) to be performed.

Abbreviations

3GPP 3rd Generation Partnership Project
LTE Long Term Evolution
M2M Machine to Machine
IE Information Element
LTE-M LTE M2M
VoLTE Voice over LTE
IoT Internet of Things
MTC Machine-type Communication
mMTC massive MTC
NB-IoT NarrowBand IoT (Release-13)
eNB-IoT enhanced NB-IoT (Release-14)
eMTC enhanced MTC (Release-13)
feMTC further enhanced MTC (Release-14)
efeMTC even further enhanced MTC (Release-15)
MMTEL Multimedia Telephony Service
UE User Equipment
UL Uplink
ACB Access Class Barring
EAB Extended Access Barring
ACDC Application specific Congestion control for Data Communication
CE Coverage Enhancement
MAC Medium Access Control
RRC Radio Resource Control
SIB System Information Block
MO Mobile Originating
MT Mobile Terminating
PRACH Physical Random Access Channel
PBCH Physical Broadcast Channel
RA Random Access
RAR Random Access Response
RSRP Reference Signal Received Power
PSS Primary synchronization signal
SSS Secondary synchronization signal

REFERENCES

[1] 3GPP TS 36.331 v14.2.1, "Evolved Universal Terrestrial Radio Access (E-UTRA); Radio Resource Control (RRC); Protocol specification"
[2] 3GPP TS 36.321 v14.2.0, "Evolved Universal Terrestrial Radio Access (E-UTRA); Medium Access Control (MAC) protocol specification"
[3] 3GPP TS 22.011 v15.0.0, "Service accessibility"
[4] 3GPP TS 23.122 v14.2.0, "Non-Access-Stratum (NAS) functions related to Mobile Station (MS) in idle mode"
[5] 3GPP TS 36.213 V14.2.0, "Evolved Universal Terrestrial Radio Access (E-UTRA); Physical layer procedures"
[6] 3GPP R1-156979: "On CE Mode Capability of eMTC", Sony
[7] 3GPP RP-170732: "New WID on Even further enhanced MTC for LTE," Ericsson, Qualcomm
[8] 3GPP RP-170852: "Further NB-IoT enhancements", Huawei

The invention claimed is:

1. An apparatus, comprising:
circuitry configured to
in response to a determination that no Random Access Response is received within a Random Access Response window, perform an access baring check within a coverage level reselection process when the coverage level changes during a Random Access procedure that is based on one or more access control parameters that are specific for a predefined coverage level.

2. The apparatus of claim 1, wherein the circuitry is further configured to
receive, for one or more predefined coverage levels, one or more access control parameters that are specific for the respective coverage level.

3. The apparatus of claim 1, wherein the circuitry is further configured to
apply the coverage specific access control parameters based on its coverage level.

4. The apparatus of claim 1, the circuitry is further configured to
in response to a determination that none of all received Random Access Responses contains a Random Access Preamble identifier, determine that the Random Access Response reception was not successful.

5. The apparatus of claim 4, wherein the circuitry is further configured to
determine whether the apparatus is in a next enhanced coverage level or whether the apparatus remains in a current enhanced coverage level.

6. A method, comprising:

in response to a determination that no Random Access Response is received within a Random Access Response window, performing an access baring check within a coverage level reselection process when the coverage level changes during a Random Access procedure that is based on one or more access control parameters that are specific for a predefined coverage level.

7. The method of claim 6, further comprising:

receiving, for one or more predefined coverage levels, one or more access control parameters that are specific for the respective coverage level.

8. The method of claim 6, further comprising:

applying the coverage specific access control parameters based on its coverage level.

9. The method of claim 6, further comprising:

in response to a determination that none of all received Random Access Responses contains a Random Access Preamble identifier, determining that the Random Access Response reception was not successful.

10. The method of claim 9, further comprising:

determining whether the apparatus is in a next enhanced coverage level or whether the apparatus remains in a current enhanced coverage level.

11. A non-transitory computer-readable storage medium storing computer-readable instructions thereon which, when executed by a computer, cause the computer to perform a method, the method comprising:

in response to a determination that no Random Access Response is received within a Random Access Response window, performing an access baring check within a coverage level reselection process when the coverage level changes during a Random Access procedure that is based on one or more access control parameters that are specific for a predefined coverage level.

12. The non-transitory computer-readable medium of claim 11, further comprising:

receiving, for one or more predefined coverage levels, one or more access control parameters that are specific for the respective coverage level.

* * * * *